US012641066B2

(12) United States Patent
Zeng et al.

(10) Patent No.: US 12,641,066 B2
(45) Date of Patent: May 26, 2026

(54) COMMUNICATION BASED ON RELAY CLUSTER

(71) Applicant: Alipay (Hangzhou) Information Technology Co., Ltd., Hangzhou (CN)

(72) Inventors: Ke Zeng, Hangzhou (CN); Yong Chen, Hangzhou (CN); Hongquan Zhang, Hangzhou (CN); Lingtao Kong, Hangzhou (CN); Han Xiao, Hangzhou (CN); Xiaokang Qin, Hangzhou (CN); Bin Yang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 240 days.

(21) Appl. No.: 18/573,556

(22) PCT Filed: Oct. 11, 2022

(86) PCT No.: PCT/CN2022/124647
§ 371 (c)(1),
(2) Date: Dec. 22, 2023

(87) PCT Pub. No.: WO2023/061370
PCT Pub. Date: Apr. 20, 2023

(65) Prior Publication Data
US 2024/0244040 A1    Jul. 18, 2024

(30) Foreign Application Priority Data

Oct. 12, 2021    (CN) .......................... 202111187242.2

(51) Int. Cl.
*G06F 15/16*        (2006.01)
*G06F 9/54*         (2006.01)
(Continued)

(52) U.S. Cl.
CPC ........ *H04L 63/0485* (2013.01); *H04L 45/745* (2013.01); *H04L 47/125* (2013.01); *H04L 61/2589* (2013.01)

(58) Field of Classification Search
CPC . H04L 63/0485; H04L 45/745; H04L 47/125; H04L 61/2589; H04L 12/54;
(Continued)

(56) References Cited

U.S. PATENT DOCUMENTS 8,832,179 B2 * 9/2014 Owen ................... H04L 63/029
709/228
10,129,412 B1 * 11/2018 Singh ............... B32B 17/10761
(Continued)

FOREIGN PATENT DOCUMENTS

CN        102014115 B   * 7/2013
CN        103414799 A     11/2013
(Continued)

OTHER PUBLICATIONS

The International Search Report and Written Opinion of the International Searching Authority for International Application No. PCT/CN2022/124647 mailed on Jan. 4, 2023.
(Continued)

*Primary Examiner* — Hamza N Algibhah
(74) *Attorney, Agent, or Firm* — Womble Bond Dickinson (US) LLP

(57) ABSTRACT

Embodiments of this specification provide a communication method and apparatus based on a relay cluster. The relay cluster includes a load balancing server and at least two relay servers. The communication method includes: receiving a relay request packet sent by a client, where the relay request packet includes a transaction identifier, and the transaction identifier includes a mode field and a routing information field; acquiring routing information of a first relay server of
(Continued)

the at least two relay servers based on a value of the mode field and a value of the routing information field in the relay request packet; and sending a relay allocation packet carrying the routing information of the first relay server to the client, so that the client establishes a relay channel based on the routing information of the first relay server.

15 Claims, 5 Drawing Sheets

(51) Int. Cl.

| | | |
|---|---|---|
| *H04L 9/40* | (2022.01) | |
| *H04L 29/06* | (2006.01) | |
| *H04L 45/745* | (2022.01) | |
| *H04L 47/125* | (2022.01) | |
| *H04L 61/2589* | (2022.01) | |

(58) Field of Classification Search
CPC ......... H04L 45/74; H04L 45/00; H04L 61/00; H04L 67/1004; H04L 67/104; H04L 67/1042
USPC ........................................................... 726/23
See application file for complete search history.

(56) References Cited

U.S. PATENT DOCUMENTS

| | | | | |
|---|---|---|---|---|
| 11,263,059 | B2 * | 3/2022 | Fry ...................... | G06F 9/5027 |
| 2003/0120734 | A1 * | 6/2003 | Kagan .................. | G06F 16/951 |
| | | | | 709/229 |
| 2006/0046713 | A1 * | 3/2006 | Yokota ................. | H04L 61/251 |
| | | | | 455/426.1 |

| | | | | |
|---|---|---|---|---|
| 2015/0067033 | A1 * | 3/2015 | Martinsen ............... | H04L 47/00 |
| | | | | 709/203 |
| 2018/0165040 | A1 * | 6/2018 | Matsuda .................. | H04N 1/00 |
| 2020/0081746 | A1 * | 3/2020 | Fry ........................ | H04L 9/3239 |
| 2022/0393856 | A1 * | 12/2022 | Goel ...................... | H04L 63/061 |
| 2023/0093278 | A1 * | 3/2023 | Majila ................... | H04L 45/745 |
| | | | | 709/238 |

FOREIGN PATENT DOCUMENTS

| | | | | | |
|---|---|---|---|---|---|
| CN | 103636173 | B | * | 2/2017 | ............. H04L 45/02 |
| CN | 111935314 | A | * | 11/2020 | ............. G06F 21/64 |
| CN | 115529478 | B | * | 7/2025 | ........... H04N 21/258 |
| EP | 2408153 | A1 | * | 1/2012 | .............. H04L 9/40 |
| EP | 2408153 | B1 | * | 10/2018 | .............. H04L 9/40 |
| EP | 2787692 | B1 | * | 2/2019 | ............. H04L 45/74 |
| EP | 4047833 | A1 | * | 8/2022 | .......... H04L 67/146 |
| FR | 2886795 | A1 | * | 12/2006 | ............. H04L 51/04 |
| JP | 2012165269 | A | * | 8/2012 | ........ H04L 12/4625 |
| RU | 2010152823 | A | * | 6/2012 | ........ H04L 61/2578 |
| TW | I474683 | B | * | 2/2015 | .............. H04L 9/40 |
| WO | WO-2011035528 | A1 | * | 3/2011 | ........ H04L 61/2589 |
| WO | WO-2012107983 | A1 | * | 8/2012 | ........ H04L 12/4625 |
| WO | WO-2012120767 | A1 | * | 9/2012 | ........... H04L 45/745 |
| WO | WO-2016205560 | A1 | * | 12/2016 | ........... H04L 69/14 |
| WO | WO-2017187260 | A1 | * | 11/2017 | ............. H04W 8/22 |

OTHER PUBLICATIONS

Yudai Kaneko et al. "2018 sixth international symposium on computing and metworking 1-25 workshops. IEEE", "DHT Clustering for Load Balancing Considering Blockchain Data Size", Nov. 28, 2018.

* cited by examiner

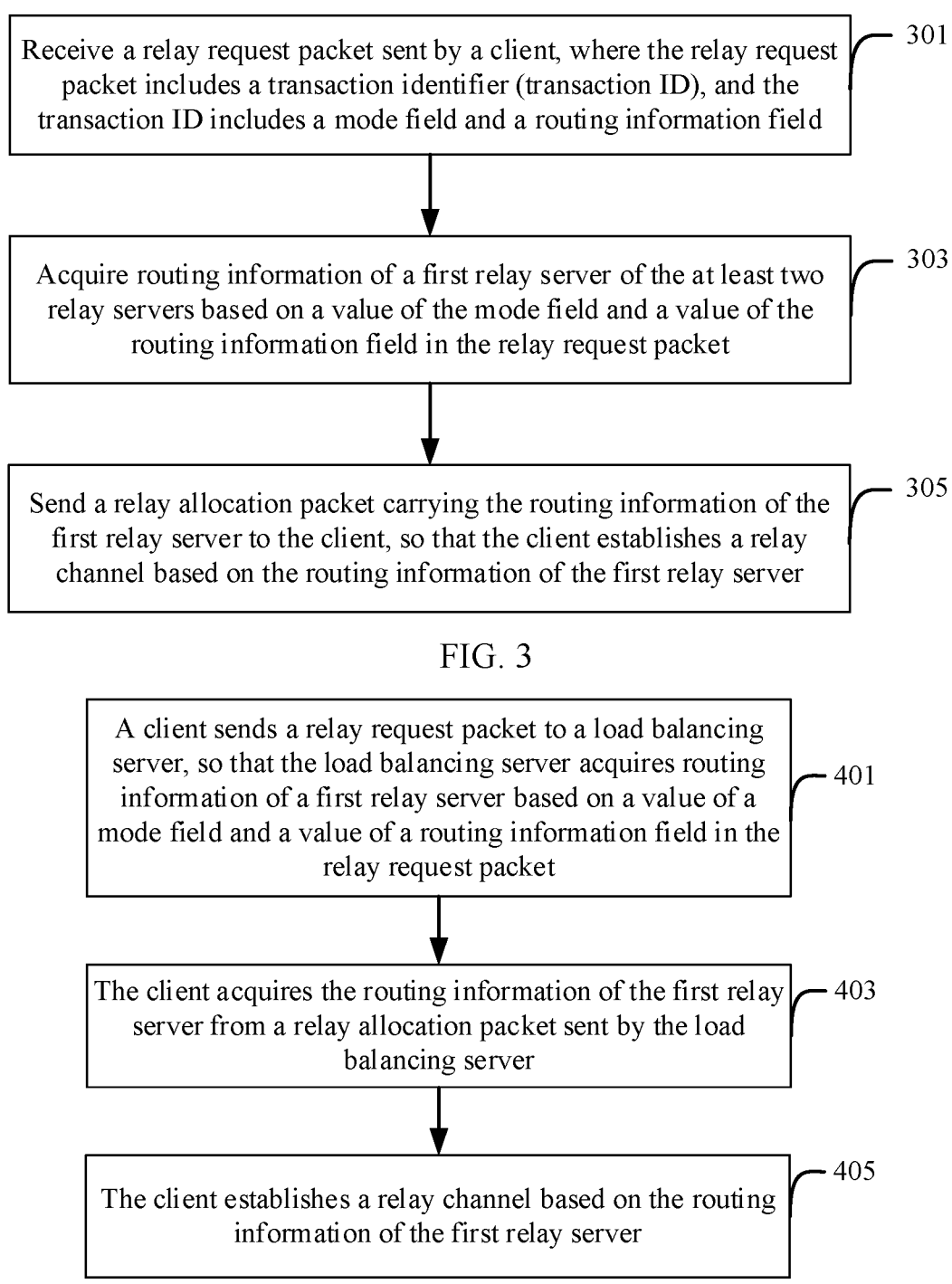

Receive a relay request packet sent by a client, where the relay request packet includes a transaction identifier (transaction ID), and the transaction ID includes a mode field and a routing information field     ⌐ 301

Acquire routing information of a first relay server of the at least two relay servers based on a value of the mode field and a value of the routing information field in the relay request packet     ⌐ 303

Send a relay allocation packet carrying the routing information of the first relay server to the client, so that the client establishes a relay channel based on the routing information of the first relay server     ⌐ 305

FIG. 3

A client sends a relay request packet to a load balancing server, so that the load balancing server acquires routing information of a first relay server based on a value of a mode field and a value of a routing information field in the relay request packet     ⌐ 401

The client acquires the routing information of the first relay server from a relay allocation packet sent by the load balancing server     ⌐ 403

The client establishes a relay channel based on the routing information of the first relay server     ⌐ 405

FIG. 4

A first relay server receives a relay request packet sent by a load balancing server ⌐ 501

The first relay server sends its own routing information to the load balancing server, so that a client establishes a relay channel based on the routing information of the first relay server forwarded by the load balancing server ⌐ 503

Client interacting module ⌐ 801

Relay transaction processing module ⌐ 802

COMMUNICATION BASED ON RELAY CLUSTER

CROSS-RELATED APPLICATIONS

This application is a national stage entry of international application no. PCT/CN2022/124647 filed on Oct. 11, 2022, which claims priority to Chinese Application No. 202111187242.2 filed on Oct. 12, 2021, which is herein incorporated by reference in its entirety.

TECHNICAL FIELD

One or more embodiments of this specification relate to network communication technologies, and in particular, to a communication method and apparatus based on a relay cluster.

BACKGROUND

A relay server is a server disposed between two clients, and is configured to share some operations of a primary server, so as to reduce read/write frequency of the primary server and increase a response speed of the primary server. In some application scenarios, two clients that perform communication need to be connected to the same relay server. For example, in a peer to peer (P2P) network scenario, the two clients that perform communication need to be connected to the same relay server that is based on the Traversal Using Relays around NAT (TURN) protocol, so that the TURN relay server forwards and processes communication data between the two clients.

When a quantity of users needing relay increases dramatically, a single relay server may not satisfy business needs.

SUMMARY

One or more embodiments of this specification describe a communication method and apparatus based on a relay cluster, so as to provide a relay service by using a plurality of relay servers in the relay cluster to satisfy business needs.

According to a first aspect, a communication method based on a relay cluster is provided, where the relay cluster includes a load balancing server and at least two relay servers; the communication method is applied to the load balancing server and includes: receiving a relay request packet sent by a client, where the relay request packet includes a transaction identifier (transaction ID), and the transaction ID includes a mode field and a routing information field; acquiring routing information of a first relay server of the at least two relay servers based on a value of the mode field and a value of the routing information field in the relay request packet; and sending a relay allocation packet carrying the routing information of the first relay server to the client, so that the client establishes a relay channel based on the routing information of the first relay server.

According to a second aspect, a communication method based on a relay cluster is provided, where the relay cluster includes a load balancing server and at least two relay servers; the at least two relay servers include a first relay server; the communication method is applied to a client and includes: sending a relay request packet to the load balancing server, where the relay request packet includes a transaction identifier (transaction ID), and the transaction ID includes a mode field and a routing information field, so that the load balancing server acquires routing information of the first relay server based on a value of the mode field and a value of the routing information field in the relay request packet; acquiring the routing information of the first relay server from a relay allocation packet sent by the load balancing server; and establishing a relay channel based on the routing information of the first relay server.

According to a third aspect, a communication method based on a relay cluster is provided, where the relay cluster includes a load balancing server and at least two relay servers; the communication method is applied to a first relay server of the at least two relay servers, and includes: receiving a relay request packet sent by the load balancing server; and sending routing information of itself to the load balancing server, so that a client establishes a relay channel based on routing information of a first relay server forwarded by the load balancing server.

According to a fourth aspect, a communication apparatus based on a relay cluster is provided, where the relay cluster includes a load balancing server and at least two relay servers; the apparatus is applied to the load balancing server and includes: a client interacting module, configured to: receive a relay request packet sent by a client, where the relay request packet includes a transaction identifier (transaction ID), and the transaction ID includes a mode field and a routing information field; and send a relay allocation packet carrying the routing information of the first relay server to the client, so that the client establishes a relay channel based on the routing information of the first relay server; and a relay transaction processing module, configured to acquire routing information of a first relay server of the at least two relay servers based on a value of the mode field and a value of the routing information field in the relay request packet.

According to a fifth aspect, a communication apparatus based on a relay cluster is provided, where the relay cluster includes a load balancing server and at least two relay servers; the at least two relay servers include a first relay server; the apparatus is applied to a client and includes: a relay channel requesting module, configured to send a relay request packet to the load balancing server, where the relay request packet includes a transaction identifier (transaction ID), and the transaction ID includes a mode field and a routing information field, so that the load balancing server acquires routing information of the first relay server based on a value of the mode field and a value of the routing information field in the relay request packet; and a relay channel establishing module, configured to: acquire the routing information of the first relay server from a relay allocation packet sent by the load balancing server; and establish a relay channel based on the routing information of the first relay server.

According to a sixth aspect, a communication apparatus based on a relay cluster is provided, where the relay cluster includes a load balancing server and at least two relay servers; the apparatus is applied to the first relay server of the at least two relay servers, and includes: an information transceiver module, configured to receive a relay request packet sent by the load balancing server; and a relay channel processing module, configured to send routing information of a first relay server to the load balancing server, so that a client establishes a relay channel based on the routing information of the first relay server forwarded by the load balancing server.

According to a seventh aspect, a computing device is provided, including a memory and a processor, where the memory stores executable code, and the processor executes the executable code to implement the method according to any embodiment of this specification.

According to the method and the apparatus provided in the embodiments of this specification, a relay cluster is built, so that the load balancing server in the relay cluster can be used to allocate different relay demands of different clients to at least two relay servers according to a load sharing rule, thereby satisfying the demands for dramatic increase of relay tasks.

BRIEF DESCRIPTION OF DRAWINGS

To describe technical solutions in embodiments of this specification or in a conventional technology more clearly, the following briefly describes accompanying drawings needed for describing the embodiments or the conventional technology. Clearly, the accompanying drawings in the following descriptions show some embodiments of this specification, and a person of ordinary skill in the art can still derive other drawings from these accompanying drawings without creative efforts.

FIG. 3 is a flowchart of a communication method based on a relay cluster implemented on a load balancing server according to an embodiment of this specification;

FIG. 4 is a flowchart of a communication method based on a relay cluster implemented on a client according to an embodiment of this specification;

DESCRIPTION OF EMBODIMENTS

As described above, in some application scenarios, two clients that perform communication need to be connected to the same relay server. For example, referring to FIG. 1, in a P2P network scenario, because two communicating clients need to be connected to the same Traversal Using Relays around NAT (TURN) relay server, there may be a case in which a large quantity of clients are connected to the same relay server, and the relay server performs a large amount of relay processing. For example, in FIG. 1, a client A1 and a client A2, a client B1 and a client B2, a client C1 and a client C2, a client D1 and a client D2 that need to perform communication need to be connected to the TURN relay server 1, which leads to overload of the TURN relay server 1.

The solutions provided in this specification are described below with reference to the accompanying drawings.

Figures 1, 2:
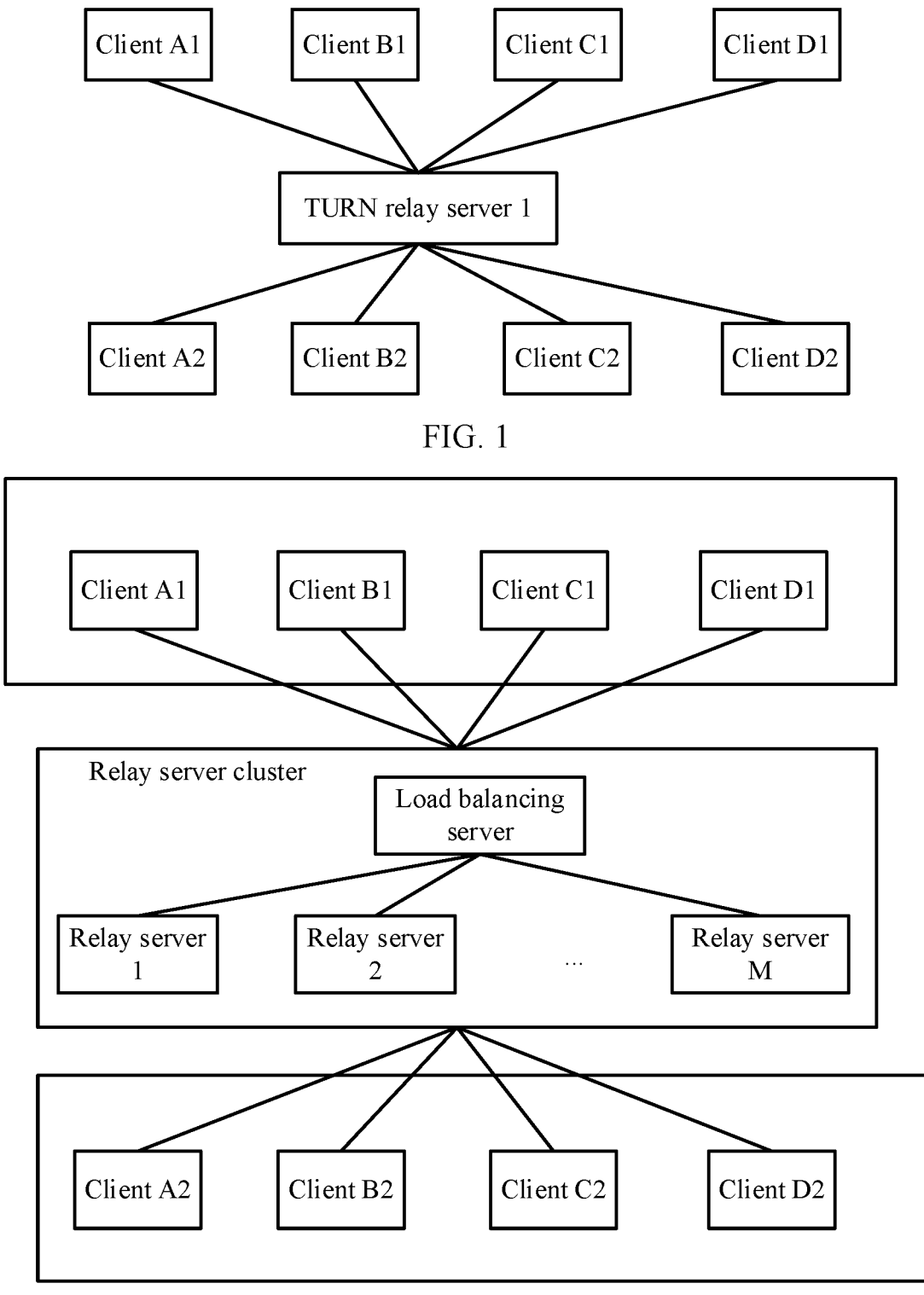
FIG. 1 is a schematic diagram of communication based on a relay server in a P2P network scenario in a conventional technology.
FIG. 2 is a schematic diagram of a system architecture to which an embodiment of this specification is applied.

To facilitate understanding of this specification, a system architecture used in this specification is first described. As shown in FIG. 2, the system architecture mainly includes clients at two ends (for example, the client A1 needs to communicate with the client A2, the client B1 needs to communicate with the client B2, the client C1 needs to communicate with the client C2, and the client D1 needs to communicate with the client D2) that need to perform communication, and a relay cluster. The relay cluster includes at least one load balancing server and at least two relay servers. The devices interact with each other through a network. The network may include various connection types, such as wired and wireless communication links, or fiber optic cables.

In the system, as shown in FIG. 2, to which an embodiment of this specification is applied, a relay cluster is built, so that the load balancing server in the relay cluster can be used to perform load balancing processing to allocate different relay demands of different clients to at least two relay servers, thereby satisfying the demands for dramatic increase of relay tasks. In addition, the packet sent by the client carries the routing information of the allocated relay server, which can ensure that the clients at two ends of communication are connected to the same relay server, thereby satisfying specific business needs.

In this embodiment of this specification, a format of each packet sent by the client to the relay cluster is redefined such that the packet carries the routing information of the relay server serving the client.

In an embodiment of this specification, an implementation of redefining a packet format so as to carry the routing information of the relay server is as follows: Each packet sent by the client carries a newly defined transaction identifier (transaction ID). The transaction ID is a "routable" transaction ID. That is, the transaction ID can carry routing information. Using the newly defined routable transaction ID can ensure that the two clients that communicate with each other are connected to the same relay server, and the relay server performs relay processing of the two clients to satisfy business needs.

The routable transaction ID includes at least a mode field, and a value of the mode field reflects an allocation status of a relay server in different business stages.

The routable transaction ID may further include a routing information field, and a value of the routing information field reflects address information of a relay server allocated in different business stages.

For example, a structure of the routable transaction ID can be defined as the following form:

```
{
    Mode-bit,
    Routing-info,
    Random-bit,
}
```

Mode-bit is the mode field, Routing-info is the routing information field, and a value of the mode field may include at least one of the following three methods.

Method 1: The value of the mode field (Mode-bit) is a value representing an arbitrary mode. The arbitrary mode indicates that a packet of the client can be sent to a default service port of any relay server in the relay cluster (such as a TURN cluster). In the arbitrary mode, the routing information field may not be included because the first relay server serving the client has not been specified. Certainly, in the arbitrary mode, the routable transaction ID may also include the routing information field (Routing-info), and a value of the routing information field may be a random string.

Method 2: The value of the mode field (Mode-bit) is a value representing a specific server mode. The specific server mode indicates that a packet of the client needs to be sent to a default service port of a specified relay server in the relay cluster (such as TURN). In the specific server mode, the routable transaction ID includes the routing information field (Routing-info), and a value of the routing information field is information about an intranet IP address of a relay server designated as the first relay server for the client.

Method 3: The value of the mode field (Mode-bit) is a value representing a specific address mode. The specific address mode indicates that a packet of the client needs to be sent to a specified port of a specified relay server in the relay cluster (such as TURN). In the specific address mode, the routable transaction ID includes the routing information field (Routing-info), and a value of the routing information field is information about an intranet IP address of the first relay server allocated to the client and information of a first port of the first relay server.

In the structure of the routable transaction ID, Random-bit is an optional parameter, which is usually a random string.

With reference to the above-mentioned transaction ID newly defined in the packet, the following separately describes a process of implementing a communication method based on a relay cluster in each device according to an embodiment of this specification.

1. Implement the communication method based on a relay cluster at a load balancing server.

FIG. 3 is a flowchart of a communication method based on a relay cluster implemented on a load balancing server according to an embodiment of this specification. The method can be performed by the load balancing server. It can be understood that the method can alternatively be performed by any apparatus, device, platform, or device cluster having computing and processing capabilities. Referring to FIG. 3, the method includes the following steps.

Step 301: Receive a relay request packet sent by a client, where the relay request packet includes a transaction identifier (transaction ID), and the transaction ID includes a mode field and a routing information field.

Step 303: Acquire routing information of a first relay server of the at least two relay servers based on a value of the mode field and a value of the routing information field in the relay request packet.

Step 305: Send a relay allocation packet carrying the routing information of the first relay server to the client, so that the client establishes a relay channel based on the routing information of the first relay server.

The two clients that communicate with each other need to establish a relay channel. In an initial stage of a relay channel establishment process, an initiator (denoted as a first client) of establishing the relay channel needs to send a relay request packet to the load balancing server, and the load balancing server performs processing shown in FIG. 3 based on the relay request packet sent by the first client. With reference to the structure of the newly defined transaction ID, Embodiment 1 is used to describe the processing.

Embodiment 1: In Embodiment 1, the client in the steps shown in FIG. 3 is the initiator of establishing the relay channel, i.e., the first client.

First, in step 301, the load balancing server receives the relay request packet sent by the first client, where the relay request packet includes a transaction identifier (transaction ID), and the transaction ID includes a mode field and a routing information field.

When performing step 301, the load balancing server has not allocated, to the first client, a relay server that serves the first client, and therefore the relay request packet sent by the first client does not include information about a specified relay server. In the relay request packet, the value of the mode field in the transaction ID represents an arbitrary mode, and the value of the routing information field in the transaction ID is a random string.

Next, in step 303, the load balancing server acquires routing information of a first relay server of the at least two relay servers based on a value of the mode field and a value of the routing information field in the relay request packet.

In an implementation of Embodiment 1 of this specification, step 303 includes: Step 3031A: The load balancing server parses the relay request packet sent by the first client. Step 3032A: When it is learned through parsing that, in the relay request packet, the value of the mode field represents an arbitrary mode, and the value of the routing information field is a random string, select a relay server, denoted as the first relay server, from the at least two relay servers according to a load balancing rule. Step 3033A: Send the relay request packet to the default service port of the first relay server. In this embodiment of this specification, the client only needs to interact directly with the load balancing server in the relay cluster, without interacting with the relay servers in the relay cluster. Therefore, the client only needs to acquire a public network IP address of the load balancing server, without requiring a public network IP address of a relay server. Therefore, corresponding to step 3033A, after receiving the relay request packet from the first client, the first relay server only needs to indicate, to the load balancing server, the routing information from the load balancing server to the first relay server, without a need to indicate the routing information from the client to the first relay server. Therefore, the routing information of the first relay server is routing information in an intranet formed by the relay cluster, and the routing information may include an intranet IP address of the first relay server in the intranet formed by the relay cluster and information about a relay port, denoted as the first port, that is allocated by the first relay server to a session of the first client.

Further, as described above, the transaction ID of each packet sent by the client needs to carry routing information, that is, the routing information of the first relay server is transmitted over the public network. Therefore, to improve security, in an embodiment of this specification, the routing information of the first relay server transmitted at each place may further be encrypted information, which, for example, is specifically an encrypted intranet IP address of the first relay server and encrypted information about the first port. In this way, although each client and each routing device in the network can obtain the routing information of the first relay server, since each client and each routing device do not have a decryption key, they cannot obtain specific content of the routing information of the first relay server. Correspondingly, corresponding to step 3033A, after receiving the relay request packet, the first relay server first separately encrypts the intranet IP address and the information about the first port, and then sends the encrypted intranet IP address and the encrypted information about the first port to the load balancing server.

The first relay server can perform encryption by using a symmetric encryption algorithm such as an AES-128-ECB algorithm, a CHACHA20-128-ECB, or an SM4-128-ECB. Using the AES-128-ECB algorithm as an example, the first relay server specifies a 16-byte key and a string of 16-byte data IV, and then encrypts the IV by using the AES-128-ECB algorithm and the key to generate a mask. The mask is configured as a decryption key for the load balancing server. In step 3033A the first relay server separately performs an exclusive OR (XOR) operation on an intranet IP address and port information of a local computer in the relay cluster with the mask, to obtain the encrypted information about the first port (Encoded-Port) and the encrypted intranet IP address (Encoded-Address).

Step 3034A: Receive the routing information of the first relay server sent by the first relay server.

Next, in step 305, the load balancing server sends a relay allocation packet carrying the routing information of the first relay server to the first client, so that the first client establishes a relay channel based on the routing information of the first relay server.

The load balancing server can send a relay allocation packet carrying the encrypted intranet IP address of the first relay server and the encrypted information about the first port to the first client.

In an embodiment of this specification, a packet format of the relay allocation packet is modified, an encrypted relay address (ENCRYPTED-RELAY-ADDRESS) is set in the relay allocation packet, and the ENCRYPTED-RELAY-ADDRESS carries the encrypted intranet IP address of the first relay server and the encrypted information about the first port.

For example, a structure format of the ENCRYPTED-RELAY-ADDRESS is as follows:

```
{
    Attribute-Type,
    Reserve-bit,
    Encoded-Port,
    Encoded-Address
}
```

Encoded-Port is an encrypted port field, and is used to carry the encrypted information about the first port. Encoded-Address is an encrypted address field, and is used to carry the encrypted intranet IP address of the first relay server. Attribute-Type is an attribute type field, which may be an optional field, and a value of this field is used to represent secure routing information. Reserve-bit is a reserved field, which may be an optional field, and is used for subsequent extension.

Therefore, in the relay allocation packet in step 305, the encrypted address field Encoded-Address carries the encrypted intranet IP address of the first relay server, and the encrypted port field Encoded-Port carries the encrypted information about the first port.

Thereafter, after receiving the relay allocation packet, the first client acquires the routing information of the first relay server from the relay allocation packet. In some application scenarios, for example, in a process of establishing a relay channel implemented based on the TURN protocol, the first client synchronizes, by using a signaling server, the routing information of the first relay server to a second client that needs to communicate with the first client. The second client also needs to send a relay request packet to the load balancing server, so as to trigger the load balancing server to perform a process of establishing a relay channel for the second client (references can be made to the description of Embodiment 2).

After both the first client and the second client acquire the routing information of the first relay server, establishment of the relay channel from the first client to the second client is completed. Thereafter, a data packet between the first client and the second client can be transmitted by using the relay channel.

As described above, each packet sent by the client includes a data packet and carries a newly defined transaction identifier (transaction ID), and the transaction ID includes at least a mode field and a routing information field. The load balancing server sends the data packet to the first relay server by using the transaction ID in the data packet. Correspondingly, after step 305, Embodiment 1 may further include: Step 307: The load balancing server receives a data packet sent by the client through the relay channel, where the data packet includes the mode field and the routing information field in the transaction ID. Step 309: Send the data packet to the first relay server based on the value of the mode field and the value of the routing information field in the data packet, so that the first relay server performs relay processing.

In an embodiment of this specification, in the data packet, the value of the mode field represents a specific address mode, the routing information field includes an encrypted address field and an encrypted port field, a value of the encrypted address field is an encrypted intranet IP address of the first relay server, and a value of the encrypted port field is encrypted information about a first port. Correspondingly, the process of step 309 includes: decrypting the encrypted address field and the encrypted port field in the data packet separately based on a pre-acquired decryption key; and after it is learned through parsing that, in the data packet, the value of the mode field represents a specific address mode, sending the data packet to the first port of the first relay server based on the intranet IP address of the first relay server and the information about the first port that are obtained through decryption.

The decryption key used by the load balancing server can be configured for the load balancing server when the relay cluster is built. The load balancing server can perform an XOR operation on the value of the Encoded-Port field and the value of the Encoded-Address field in the data packet separately with the decryption key, i.e., the above-mentioned mask, thereby obtaining the intranet IP address and information about the first port of the first relay server through decryption.

The data packet included in step 307 to step 309 may be a data packet sent by the first client that serves as the initiator of establishing the relay channel, or may be a data packet sent by a second client that serves as a responder of establishing the relay channel.

Embodiment 1 describes the processing of establishing the relay channel shown in FIG. 3 performed by the load balancing server based on the relay request packet sent by the first client, and the subsequent processing of the data packets sent by the first client/second client.

In some embodiments, a responder (denoted as a second client) of establishing the relay channel also needs to send a relay request packet to the load balancing server, and the load balancing server performs processing shown in FIG. 3 based on the relay request packet sent by the second client. With reference to the structure of the newly defined transaction ID, Embodiment 2 is used to describe the processing.

Embodiment 2: In Embodiment 2, the client in the steps shown in FIG. 3 is the responder of establishing the relay channel, i.e., the second client.

In step 301, the load balancing server receives the relay request packet sent by the second client, where the relay request packet includes a transaction identifier (transaction ID), and the transaction ID includes a mode field and a routing information field.

Next, in step 303, the load balancing server acquires routing information of a first relay server of the at least two relay servers based on a value of the mode field and a value of the routing information field in the relay request packet.

As described above, the relay request packet sent by the second client includes a transaction ID. When performing step 303, the load balancing server has already allocated the first relay server for the session of the first client and the second client. In order to make the second client correspond to the same relay server in the relay cluster as the first client, the first relay server needs to be specified in the relay request packet sent by the second client. Therefore, in the relay request packet, the value of the mode field in the transaction ID represents a specific server mode, the routing information field includes an encrypted address field, and a value of the encrypted address field is an encrypted intranet IP address of the first relay server.

In an implementation of Embodiment 2 of this specification, a specific implementation process of step 303 includes the following steps:

Step 3031B: The load balancing server parses the relay request packet sent by the second client.

Step 3032B: The load balancing server decrypts the encrypted address field in the relay request packet based on a pre-acquired decryption key to obtain the intranet IP address of the first relay server.

Step 3033B: After learning through parsing that, in the relay request packet, the value of the mode field represents a specific server mode, the load balancing server sends the relay request packet to a default service port of the first relay server based on the intranet IP address that is obtained through decryption.

In step 3033B, after learning through parsing that, the value of the mode field in the transaction ID represents a specific server mode, the load balancing server decrypts the value of the routing information field by using a pre-acquired decryption key, i.e., the above-mentioned mask (for example, performing an XOR operation on the Encoded-Address with the mask), to obtain the intranet IP address of the first relay server. In this case, it can be determined that the first relay server has been specified in the packet. Therefore, the load balancing server sends the relay request packet to a default service port of the first relay server based on the intranet IP address of the first relay server that is obtained through decryption.

After receiving the relay request packet from the second client, the first relay server can send the encrypted intranet IP address and the encrypted information about the first port to the load balancing server.

Step 3034B: The load balancing server receives the routing information of the first relay server sent by the first relay server.

Next, in step 305, the load balancing server sends a relay allocation packet carrying the routing information of the first relay server to the second client, so that the second client establishes a relay channel based on the routing information of the first relay server.

The load balancing server can send a relay allocation packet carrying the encrypted routing information of the first relay server (for example, including the encrypted intranet IP address of the first relay server and the encrypted information about the first port) to the second client, which can be specifically carried in the encrypted relay address parameter (ENCRYPTED-RELAY-ADDRESS) in the relay allocation packet, as described above. For a specific implementation principle and process, references can be made to the description of step 305 in Embodiment 1.

Thereafter, after receiving the relay allocation packet, the second client acquires the routing information of the first relay server from the relay allocation packet. In some application scenarios, for example, in a process of establishing a relay channel implemented based on the TURN protocol, the second client synchronizes, by using a signaling server, the routing information of the first relay server to a first client that needs to communicate with the second client.

At this point, the first client and the second client that communicate with each other have acquired the routing information of the first relay server. Thereafter, the first client and the second client separately initiate a link check procedure to the load balancing server. After the check succeeds, a relay channel between the first client and the second client is successfully established. Thereafter, a data packet between the first client and the second client can be transmitted by using the relay channel.

A process in which the load balancing server processes the data packet between the first client and the second client has been described in Embodiment 1 through the related descriptions of steps 307 and 309.

Implementation of the method for client communication based on the relay cluster in the load balancing server of the relay cluster has been described above.

2. Implement the communication method based on a relay cluster at a client.

FIG. 4 is a flowchart of a communication method based on a relay cluster implemented on a client according to an embodiment of this specification. The method can be performed by a client. It can be understood that the method can alternatively be performed by any apparatus, device, platform, or device cluster having computing and processing capabilities. Referring to FIG. 4, the method includes: Step 401: A client sends a relay request packet to a load balancing server, where the relay request packet includes a transaction identifier (transaction ID), and the transaction ID includes a mode field and a routing information field, so that the load balancing server acquires routing information of the first relay server based on a value of the mode field and a value of the routing information field in the relay request packet. Step 403: The client acquires the routing information of the first relay server from a relay allocation packet sent by the load balancing server. Step 405: The client establishes a relay channel based on the routing information of the first relay server.

As described above, two clients that communicate with each other need to establish a relay channel. In an initial stage of a relay channel establishment process, an initiator, i.e., a first client, of establishing the relay channel needs to establish the relay channel by using the above-mentioned procedure shown in FIG. 4. With reference to the structure of the newly defined transaction ID, Embodiment 3 is used to describe the processing.

Embodiment 3: Embodiment 3 corresponds to Embodiment 1. In Embodiment 3, an executing subject of the steps shown in FIG. 4 is the initiator of establishing the relay channel, i.e., the first client.

First, in step 401, the first client sends a relay request packet to the load balancing server by using the pre-acquired public network IP address of the load balancing server.

With reference to the description of step 301 in Embodiment 1, in step 401, in the relay request packet, the value of the mode field represents an arbitrary mode, and the value of the routing information field is a random string.

Next, in step 403, the first client acquires the routing information of the first relay server from a relay allocation packet sent by the load balancing server.

In Embodiment 3, the routing information of the first relay server may be encrypted routing information, including an encrypted intranet IP address of the first relay server and encrypted information about a first port of the first relay server.

Corresponding to the description of step 305 in Embodiment 1, the relay allocation packet includes an encrypted relay address (ENCRYPTED-RELAY-ADDRESS); ENCRYPTED-RELAY-ADDRESS includes an encrypted address field and an encrypted port field; an implementation process of step 403 in Embodiment 4 includes: the first client obtains the encrypted intranet IP address of the first relay server from the encrypted address field of the relay allocation packet, and obtains the encrypted information about the first port from the encrypted port field of the relay allocation packet.

Next, in step 405, the first client establishes a relay channel based on the routing information of the first relay server.

Specifically, the first client synchronizes the routing information of the first relay server to the second client by using the signaling server. After receiving the routing information of the first relay server that is synchronized by the second client by using the signaling server, the first client initiates a link check procedure to the load balancing server. After the check succeeds, the relay channel is successfully established.

Then, the first client sends a data packet to the load balancing server through the relay channel, so that the load balancing server forwards the data packet to the first relay server based on the value of the mode field and the value of the routing information field in the transaction ID included in the data packet.

As described above, corresponding to related descriptions of step 307 to step 309 in Embodiment 1, in the transaction ID of the data packet, the routing information field includes an encrypted address field and an encrypted port field. A specific process in which the first client sends the data packet to the load balancing server may include: setting the value of the mode field in the data packet to represent a specific address mode, setting the value of the encrypted address field in the data packet to the encrypted intranet IP address of the first relay server, and setting the value of the encrypted port field in the data packet to the encrypted information about the first port, and then sending the data packet to the load balancing server.

In the relay channel establishment process, a responder, i.e., a second client, of establishing the relay channel needs to establish the relay channel by using the above-mentioned procedure shown in FIG. 4. With reference to the structure of the newly defined transaction ID, Embodiment 4 is used to describe the processing.

Embodiment 4: Embodiment 4 corresponds to Embodiment 2. In Embodiment 4, an executing subject of the steps shown in FIG. 4 is the responder of establishing the relay channel, i.e., the second client.

First, in step 401, the second client sends a relay request packet to the load balancing server by using the pre-acquired public network IP address of the load balancing server.

Here, the second client can perform the processing of step 401 after receiving the routing information of the first relay server synchronized by the first client by using the signaling server.

References are made to the description of step 303 in Embodiment 2. In the relay request packet sent by the second client, the value of the mode field in the transaction ID represents a specific server mode, the routing information field includes an encrypted address field, and a value of the encrypted address field is an encrypted intranet IP address of the first relay server.

Next, in step 403, the second client acquires the routing information of the first relay server from a relay allocation packet sent by the load balancing server.

In Embodiment 4, the routing information of the first relay server may be encrypted routing information, including an encrypted intranet IP address of the first relay server and encrypted information about a first port of the first relay server.

Corresponding to the description of step 305 in Embodiment 2, the relay allocation packet includes an encrypted relay address (ENCRYPTED-RELAY-ADDRESS); ENCRYPTED-RELAY-ADDRESS includes an encrypted address field and an encrypted port field; an implementation process of step 403 in Embodiment 4 includes: the second client obtains the encrypted intranet IP address of the first relay server from the encrypted address field of the relay allocation packet, and obtains the encrypted information about the first port from the encrypted port field of the relay allocation packet.

Next, in step 405, the second client establishes a relay channel based on the routing information of the first relay server.

Specifically, the second client synchronizes the routing information of the first relay server to the first client by using the signaling server. Then, the second client initiates a link check procedure to the load balancing server, and after the check succeeds, the relay channel is successfully established.

Then, the second client sends a data packet to the load balancing server through the relay channel, so that the load balancing server forwards the data packet to the first relay server based on the value of the mode field and the value of the routing information field in the transaction ID included in the data packet.

As described above, corresponding to related descriptions of step 307 to step 309 in Embodiment 1, in the transaction ID of the data packet, the routing information field includes an encrypted address field and an encrypted port field. A specific process in which the second client sends the data packet to the load balancing server may include: setting the value of the mode field in the data packet to represent a specific address mode, setting the value of the encrypted address field in the data packet to the encrypted intranet IP address of the first relay server, and setting the value of the encrypted port field in the data packet to the encrypted information about the first port, and then sending the data packet to the load balancing server.

3. Implement the communication method based on a relay cluster in a relay server of the relay cluster.

Figure 5:
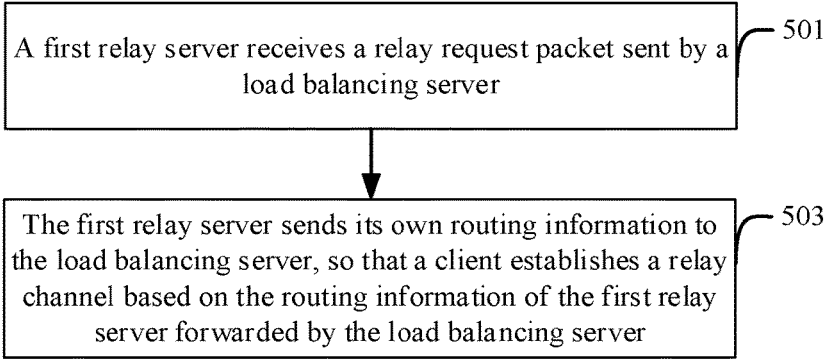
FIG. 5 is a flowchart of a communication method based on a relay cluster implemented on a first relay server according to an embodiment of this specification.

FIG. 5 is a flowchart of a communication method based on a relay cluster implemented on a relay server according to an embodiment of this specification. The method can be performed by a relay server, and is described from the perspective of a first relay server. It can be understood that the method can alternatively be performed by any apparatus, device, platform, or device cluster having computing and processing capabilities. Referring to FIG. 5, the method includes: Step 501: A first relay server receives a relay request packet sent by a load balancing server. Step 503: The first relay server sends its own routing information to the load balancing server, so that the client establishes a relay channel based on the routing information of the first relay server forwarded by the load balancing server.

In the above-mentioned process shown in FIG. 5, the relay request packet can be sent by the initiator of establishing the relay channel, i.e., the first client, by using the load balancing server, or can be sent by the responder of establishing the relay channel, i.e., the second client, by using the load balancing server.

In step 501, the first relay server receives the relay request packet of the first client/second client through the default service port.

In an embodiment of this specification, the routing information of the first relay server in step 503 includes an encrypted intranet IP address of the first relay server and encrypted information about a first port.

With reference to the newly defined ENCRYPTED-RE-LAY-ADDRESS and the descriptions in Embodiment 1 to Embodiment 4, an implementation process of step 503 includes: encrypting the intranet IP address of the first relay server, and encrypting the information about the first port; adding the encrypted intranet IP address to an encrypted address field of an encrypted relay address (ENCRYPTED-RELAY-ADDRESS) included in the relay allocation packet, adding the encrypted information about the first port to an encrypted port field of the ENCRYPTED-RELAY-AD-DRESS, and then sending the relay allocation packet to the load balancing server, so that the load balancing server obtains the routing information of the first relay server.

Thereafter, the first relay server receives, through the first port, the data packets of the first client/second client sent by the load balancing server, and performs relay processing on the data packets.

Figure 6:
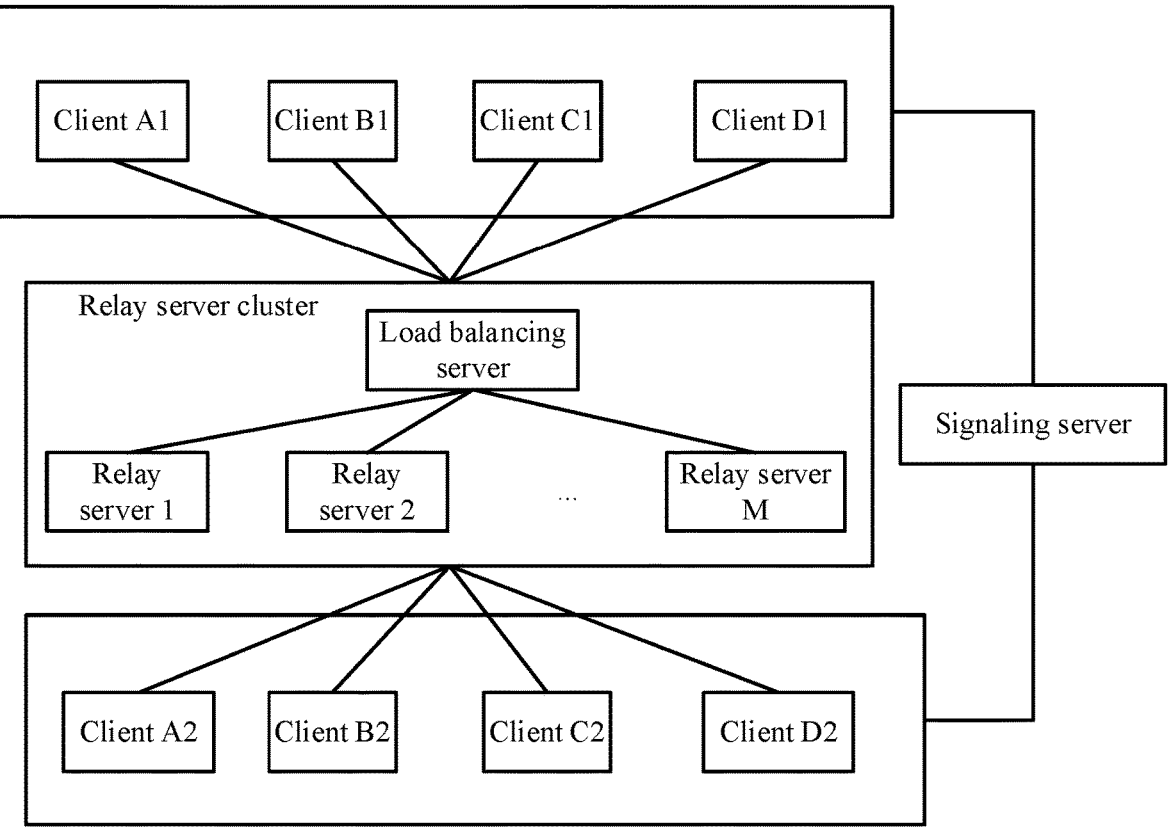
FIG. 6 is a schematic diagram of another system architecture to which an embodiment of this specification is applied.
Figures 7, 8:
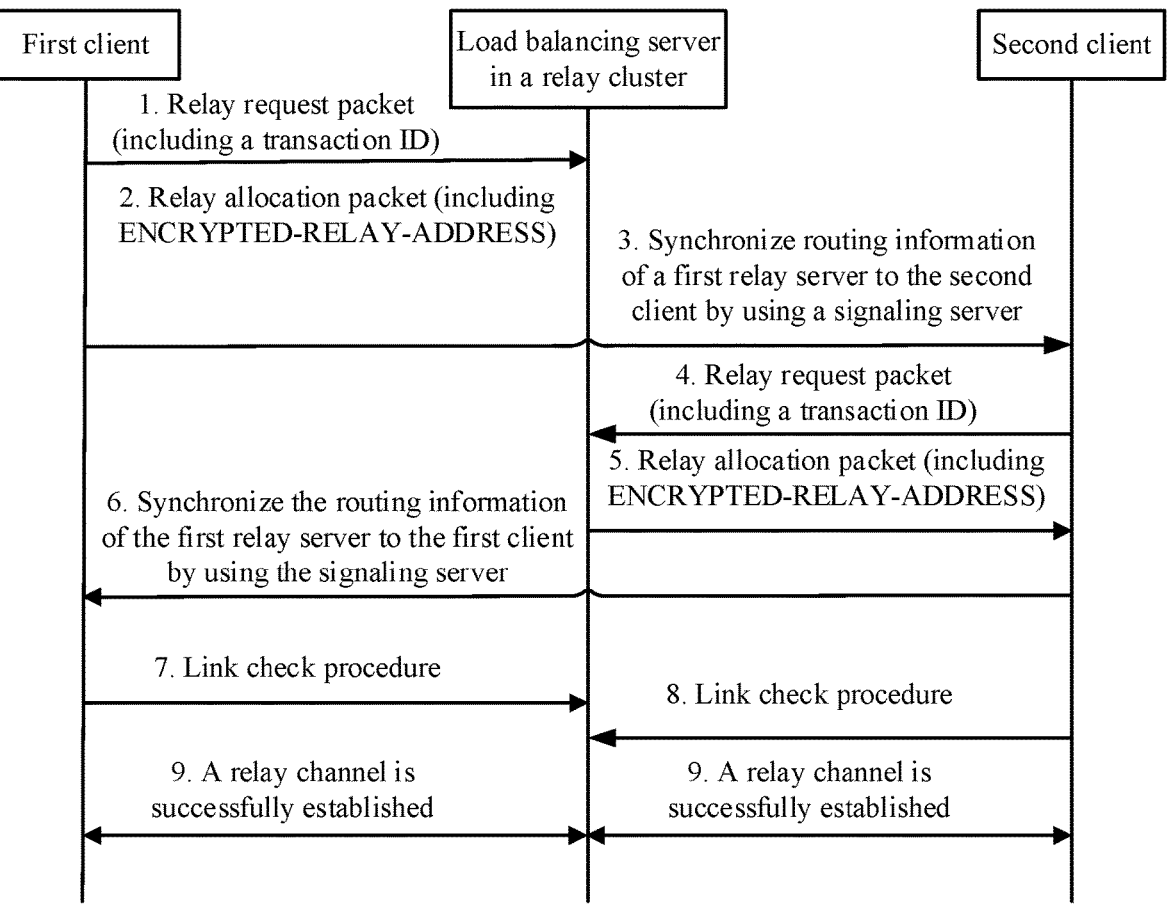
FIG. 7 is a flowchart of establishing a relay channel according to an embodiment of this specification.
FIG. 8 is a schematic structural diagram of an apparatus applied to a load balancing server according to an embodiment of this specification.

In an embodiment of this specification, with reference to the related descriptions of the processing of the load balancing server, the client, and the relay server in the above-mentioned first, second, and third points, a structural diagram of a communication system based on a relay cluster shown in FIG. 6 can be obtained. Referring to FIG. 6 and FIG. 7, a process of establishing a relay channel by using a relay cluster includes the following steps:

In step 1, the first client sends the relay request packet in any one of the above-mentioned embodiments to the load balancing server.

In step 2, the load balancing server returns the relay allocation packet in any one of the above-mentioned embodiments to the first client.

In step 3, the first client synchronizes the routing information of the first relay server to the second client by using the signaling server.

In step 4, the second client sends the relay request packet in any one of the above-mentioned embodiments to the load balancing server.

In step 5, the load balancing server returns the relay allocation packet in any one of the above-mentioned embodiments to the second client.

In step 6, the second client synchronizes the routing information of the first relay server to the first client by using the signaling server.

In step 7, the first client initiates a link check procedure to the load balancing server.

Here, during the check, the first client uses the transaction ID to carry the routing information of the first relay server, so as to perform the check.

In step 8, the second client initiates a link check procedure to the load balancing server.

Here, during the check, the second client uses the transaction ID to carry the routing information of the first relay server, so as to perform the check.

In step 9, after the link check succeeds, the relay channel is successfully established.

In an embodiment of this specification, a communication apparatus based on a relay cluster is further provided, where the relay cluster includes a load balancing server and at least two relay servers; referring to FIG. 8, the apparatus is applied to the load balancing server and includes: a client interacting module 801, configured to: receive a relay request packet sent by a client, where the relay request packet includes a transaction identifier (transaction ID), and the transaction ID includes a mode field and a routing information field; and send a relay allocation packet carrying the routing information of the first relay server to the client, so that the client establishes a relay channel based on the routing information of the first relay server; and a relay transaction processing module 802, configured to acquire routing information of a first relay server of the at least two relay servers based on a value of the mode field and a value of the routing information field in the relay request packet.

In this specification, in an embodiment of the above-mentioned apparatus applied to the load balancing server, the routing information of the first relay server includes an encrypted intranet IP address of the first relay server and encrypted information about a first port of the first relay server. The intranet IP address is an IP address of the first relay server in an intranet formed by the relay cluster, and the first port is a relay port allocated to the client on the first relay server.

Based on the above-mentioned transaction ID, the above-mentioned apparatus disposed in the load balancing server may include at least one of the following embodiments: Embodiment A: In the relay request packet, the value of the mode field represents an arbitrary mode; the value of the routing information field is a random string; correspondingly, the relay transaction processing module 802 is configured to perform the following operations: when it is learned through parsing that, in the relay request packet, the value of the mode field represents an arbitrary mode, and the value of the routing information field is a random string, selecting the first relay server from the at least two relay servers according to a load balancing rule; sending the relay request packet to a default service port of the first relay server; and receiving the routing information sent by the first relay server.

Embodiment B: In the relay request packet, the value of the mode field represents a specific server mode, and the value of the encrypted address field is the encrypted intranet IP address of the first relay server; correspondingly, the relay transaction processing module 802 is configured to perform the following operations: decrypting the encrypted address field in the relay request packet based on a pre-acquired decryption key to obtain the intranet IP address of the first relay server; after it is learned through parsing that, in the relay request packet, the value of the mode field represents a specific server mode, sending the relay request packet to a default service port of the first relay server based on the obtained intranet IP address; and receiving the routing information sent by the first relay server.

Embodiment C: The relay transaction processing module 802 is further configured to perform the following operations: receiving a data packet sent by the client through the relay channel, where the data packet includes the mode field and the routing information field in the transaction ID; and sending the data packet to the first relay server based on a value of the mode field and a value of the routing information field in the data packet.

Embodiment D: Based on Embodiment C, in the data packet, the value of the mode field represents a specific address mode, and the routing information field includes an encrypted address field and an encrypted port field; the value of the encrypted address field is the encrypted intranet IP address of the first relay server; the value of the encrypted port field is the encrypted information about the first port; the relay transaction processing module 802 is configured to perform the following operations: decrypting the encrypted address field and the encrypted port field in the data packet separately based on a pre-acquired decryption key; and after it is learned through parsing that, in the data packet, the value of the mode field represents a specific address mode, sending the data packet to the first port of the first relay server based on the intranet IP address of the first relay server and the information about the first port that are obtained through decryption.

Figures 9, 10:
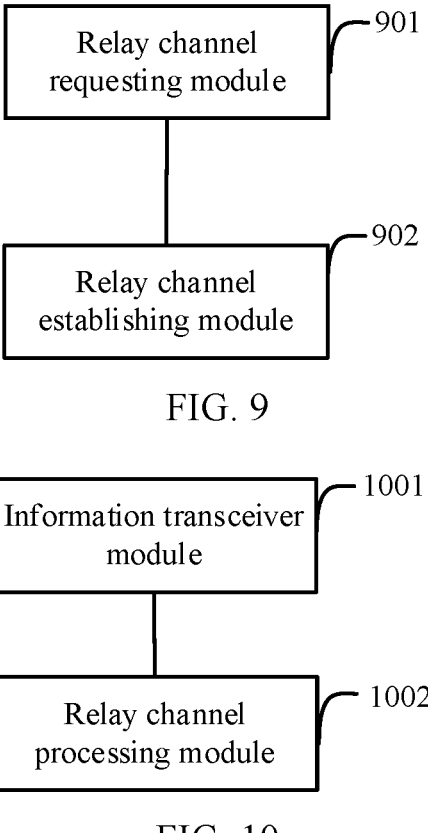
FIG. 9 is a schematic structural diagram of an apparatus applied to a client according to an embodiment of this specification.
FIG. 10 is a schematic structural diagram of an apparatus applied to a first relay server according to an embodiment of this specification.

In an embodiment of this specification, a communication apparatus based on a relay cluster is further provided, where the relay cluster includes a load balancing server and at least two relay servers; referring to FIG. 9, the apparatus is applied to a client and includes: a relay channel requesting module 901, configured to send a relay request packet to the load balancing server, where the relay request packet includes a transaction identifier (transaction ID), and the transaction ID includes a mode field and a routing information field, so that the load balancing server acquires routing information of the first relay server based on a value of the mode field and a value of the routing information field in the relay request packet; and a relay channel establishing module 902, configured to: acquire the routing information of the first relay server from a relay allocation packet sent by the load balancing server; and establish a relay channel based on the routing information of the first relay server.

In an embodiment of the apparatus shown in FIG. 9, the routing information of the first relay server includes an encrypted intranet IP address of the first relay server and encrypted information about a first port of the first relay server. The intranet IP address is an IP address of the first relay server in an intranet formed by the relay cluster, and the first port is a relay port allocated to the client on the first relay server.

During implementation of the embodiment of the apparatus shown in FIG. 9, the relay allocation packet includes an encrypted relay address (ENCRYPTED-RELAY-ADDRESS); the ENCRYPTED-RELAY-ADDRESS includes an encrypted address field and an encrypted port field; the relay channel establishing module 902 is configured to perform the following operations: obtaining the encrypted intranet IP address of the first relay server from the encrypted address field of the relay allocation packet, and obtaining the encrypted information about the first port from the encrypted port field of the relay allocation packet.

When the apparatus shown in FIG. 9 is applied to the initiator of establishing the relay channel, i.e., the first client, the relay channel requesting module 901 is configured to perform the following operations: setting the value of the mode field in the relay request packet to represent an arbitrary mode, and setting the value of the routing information field in the relay request packet to a random string, and then sending the relay request packet to the load balancing server.

When the apparatus shown in FIG. 9 is applied to the responder of establishing the relay channel, i.e., the second client, the routing information field includes an encrypted address field; the relay channel requesting module 901 is configured to perform the following operations: setting the value of the mode field in the relay request packet to represent a specific server mode, and setting a value of the encrypted address field in the relay request packet to an encrypted intranet IP address of the first relay server, and then sending the relay request packet to the load balancing server.

Regardless of whether the apparatus shown in FIG. 9 is applied to the first client or the second client, the apparatus may further include: a data processing module, configured to send a data packet to the load balancing server through the relay channel, so that the load balancing server forwards the data packet to the first relay server based on the value of the mode field and the value of the routing information field in the transaction ID included in the data packet.

When the apparatus shown in FIG. 9 includes a data processing module, the routing information field in the transaction ID includes an encrypted address field and an encrypted port field; the data processing module is configured to perform the following operations: setting the value of the mode field in the data packet to represent a specific address mode, setting the value of the encrypted address field in the data packet to the encrypted intranet IP address of the first relay server, and setting the value of the encrypted port field in the data packet to the encrypted information about the first port, and then sending the data packet to the load balancing server.

In an embodiment of this specification, a communication apparatus based on a relay cluster is further provided, where the relay cluster includes a load balancing server and at least two relay servers; the apparatus is applied to the first relay server of the at least two relay servers. Referring to FIG. 10, the apparatus includes: an information transceiver module 1001, configured to receive a relay request packet sent by the load balancing server; and a relay channel processing module 1002, configured to send routing information of a first relay server to the load balancing server, so that a client establishes a relay channel based on the routing information of the first relay server forwarded by the load balancing server.

In an embodiment of the apparatus shown in FIG. 10, the relay channel processing module 1002 is configured to perform the following operations: encrypting the intranet IP address of the first relay server, and encrypting the information about the first port; adding the encrypted intranet IP address to an encrypted address field of an encrypted relay address (ENCRYPTED-RELAY-ADDRESS) included in the relay allocation packet, adding the encrypted information about the first port to an encrypted port field of the ENCRYPTED-RELAY-ADDRESS, and then sending the relay allocation packet to the load balancing server, so that the load balancing server obtains the routing information of the first relay server.

In the embodiments of this specification, the communication method can be based on the TURN protocol, that is, each packet is a packet based on the TURN protocol, and the relay cluster is a relay cluster established based on the TURN protocol.

An embodiment of this specification provides a computer-readable storage medium, where the computer-readable storage medium stores a computer program, and when the computer program is executed on a computer, the computer is enabled to perform the method according to any embodiment of this specification.

An embodiment of this specification provides a computing device, including a memory and a processor, where the memory stores executable code, and the processor executes the executable code to implement the method according to any embodiment of this specification.

It can be understood that the structure illustrated in the embodiments of this specification does not constitute a specific limitation on the apparatus in the embodiments of this specification. In some other embodiments of this specification, the above-mentioned apparatus may include more or fewer components than those shown in the figure, or combine some components, or split some components, or have different component arrangements. The components in the figure can be implemented by hardware, software, or a combination of software and hardware.

Content such as information exchange and an execution process between the modules in the apparatus and the system is based on the same idea as the method embodiments of this specification. Therefore, for detailed content, references can be made to descriptions in the method embodiments of this specification, and details are not described herein again.

The embodiments of this specification are described in a progressive way. For same or similar parts of the embodiments, mutual references can be made to the embodiments. Each embodiment focuses on a difference from other embodiments. Particularly, the apparatus embodiments are briefly described because they are basically similar to the method embodiments. For related parts, references can be made to related descriptions in the method embodiments.

It should be understood that the foregoing descriptions are merely the specific implementations of this specification and are not intended to limit the protection scope of this specification. Any modification, equivalent replacement, or improvement made based on the technical solutions of this specification shall fall within the protection scope of this specification.

What is claimed is:

1. A communication method based on a relay cluster, wherein the relay cluster comprises a load balancing server and at least two relay servers; the communication method comprises:

receiving a relay request packet sent by a client, wherein the relay request packet comprises a transaction identifier, and the transaction identifier comprises a mode field and a routing information field;

acquiring routing information of a first relay server of the at least two relay servers based on a value of the mode field and a value of the routing information field in the relay request packet; and sending a relay allocation packet carrying the routing information of the first relay server to the client, so that the client establishes a relay channel based on the routing information of the first relay server;

wherein the method further comprises:

receiving a data packet sent by the client through the relay channel, wherein the data packet comprises the mode field and the routing information field in the transaction identifier; and sending the data packet to the first relay server based on a value of the mode field and a value of the routing information field in the data packet;

wherein in the data packet, the value of the mode field represents a specific address mode, the routing information field comprises an encrypted address field and an encrypted port field, a value of the encrypted address field is an encrypted intranet IP address of the first relay server, and a value of the encrypted port field is encrypted information about a first port;

the sending the data packet to the first relay server comprises:

decrypting the encrypted address field and the encrypted port field in the data packet separately based on a pre-acquired decryption key; and after it is learned through parsing that, in the data packet, the value of the mode field represents a specific address mode, sending the data packet to the first port of the first relay server based on the intranet IP address of the first relay server and the information about the first port that are obtained through decryption.

2. The method according to claim 1, wherein the routing information of the first relay server comprises an encrypted intranet IP address of the first relay server and encrypted information about a first port;

the intranet IP address is an IP address of the first relay server in an intranet formed by the relay cluster; the first port is a relay port allocated to the client on the first relay server.

3. The method according to claim 2, wherein the relay allocation packet comprises an encrypted relay address;

the encrypted relay address comprises an encrypted address field and an encrypted port field;

in the relay allocation packet, the encrypted address field is used to carry the encrypted intranet IP address of the first relay server, and the encrypted port field is used to carry the encrypted information about the first port.

4. The method according to claim 3, wherein the encrypted relay address further comprises an attribute type field and/or a reserved field;

in the relay allocation packet, a value of the attribute type field represents secure routing information.

5. The method according to claim 1, wherein the client is an initiator of establishing the relay channel;

in the relay request packet, the value of the mode field represents an arbitrary mode, and the value of the routing information field is a random string;

the acquiring routing information of a first relay server of the at least two relay servers comprises:

when it is learned through parsing that, in the relay request packet, the value of the mode field represents an arbitrary mode, and the value of the routing information field is a random string, selecting the first relay server from the at least two relay servers according to a load balancing rule;

sending the relay request packet to a default service port of the first relay server; and receiving the routing information sent by the first relay server.

6. The method according to claim 1, wherein the client is a responder of establishing the relay channel;

in the relay request packet, the value of the mode field represents a specific server mode, the routing information field comprises an encrypted address field, and a value of the encrypted address field is an encrypted intranet IP address of the first relay server;

the acquiring routing information of a first relay server of the at least two relay servers comprises:

decrypting the encrypted address field in the relay request packet based on a pre-acquired decryption key to obtain the intranet IP address of the first relay server;

after it is learned through parsing that, in the relay request packet, the value of the mode field represents a specific server mode, sending the relay request packet to a default service port of the first relay server based on the obtained intranet IP address; and receiving the routing information sent by the first relay server.

7. The method according to claim 1, wherein each packet is a packet based on the Traversal Using Relays around NAT (TURN) protocol.

8. A communication method based on a relay cluster, wherein the relay cluster comprises a load balancing server and at least two relay servers; the at least two relay servers comprise a first relay server; the communication method comprises:

sending a relay request packet to the load balancing server, wherein the relay request packet comprises a transaction identifier, and the transaction identifier comprises a mode field and a routing information field, so that the load balancing server acquires routing information of the first relay server based on a value of the mode field and a value of the routing information field in the relay request packet;

acquiring the routing information of the first relay server from a relay allocation packet sent by the load balancing server;

establishing a relay channel based on the routing information of the first relay server; and sending a data packet to the load balancing server through the relay channel, so that the load balancing server forwards the data packet to the first relay server based on the value of the mode field and the value of the routing information field in the transaction identifier comprised in the data packet;

wherein the routing information field comprises an encrypted address field and an encrypted port field; the sending a data packet to the load balancing server comprises:

setting the value of the mode field in the data packet to represent a specific address mode;

setting a value of the encrypted address field in the data packet to an encrypted intranet IP address of the first relay server;

setting a value of the encrypted port field in the data packet to encrypted information about a first port; and then sending the data packet to the load balancing server.

9. The method according to claim 8, wherein the routing information of the first relay server comprises an encrypted intranet IP address of the first relay server and encrypted information about a first port of the first relay server;

the intranet IP address is an IP address of the first relay server in an intranet formed by the relay cluster; the first port is a relay port allocated to the client on the first relay server.

10. The method according to claim 9, wherein the relay allocation packet comprises an encrypted relay address;

the encrypted relay address comprises an encrypted address field and an encrypted port field;

the acquiring routing information of the first relay server comprises:

obtaining the encrypted intranet IP address of the first relay server from the encrypted address field of the relay allocation packet, and obtaining the encrypted information about the first port from the encrypted port field of the relay allocation packet.

11. The method according to claim 8, wherein the client is an initiator of establishing the relay channel;

the sending a relay request packet to the load balancing server comprises:

setting the value of the mode field in the relay request packet to represent an arbitrary mode, and setting the value of the routing information field in the relay request packet to a random string, and then sending the relay request packet to the load balancing server.

12. The method according to claim 8, wherein the client is a responder of establishing the relay channel, and the routing information field comprises an encrypted address field;

the sending a relay request packet to the load balancing server comprises:

setting the value of the mode field in the relay request packet to represent a specific server mode, and setting a value of the encrypted address field in the relay request packet to an encrypted intranet IP address of the first relay server, and then sending the relay request packet to the load balancing server.

13. The method according to claim 8, wherein each packet is a packet based on the Traversal Using Relays around NAT (TURN) protocol.

14. A computing device, comprising a memory and a processor, wherein the memory stores executable instructions that, in response to execution by the processor, cause the processor to:

receive a relay request packet sent by a client, wherein the relay request packet comprises a transaction identifier, and the transaction identifier comprises a mode field and a routing information field;

acquire routing information of a first relay server of the at least two relay servers based on a value of the mode field and a value of the routing information field in the relay request packet; and send a relay allocation packet carrying the routing information of the first relay server to the client, so that the client establishes a relay channel based on the routing information of the first relay server;

wherein the memory further stores executable instructions that, in response to execution by the processor, cause the processor to:

receive a data packet sent by the client through the relay channel, wherein the data packet comprises the mode field and the routing information field in the transaction identifier; and send the data packet to the first relay server based on a value of the mode field and a value of the routing information field in the data packet;

wherein in the data packet, the value of the mode field represents a specific address mode, the routing information field comprises an encrypted address field and an encrypted port field, a value of the encrypted address field is an encrypted intranet IP address of the first relay server, and a value of the encrypted port field is encrypted information about a first port;

the sending the data packet to the first relay server comprises:

decrypting the encrypted address field and the encrypted port field in the data packet separately based on a pre-acquired decryption key; and after it is learned through parsing that, in the data packet, the value of the mode field represents a specific address mode, sending the data packet to the first port of the first relay server based on the intranet IP address of the first relay server and the information about the first port that are obtained through decryption.

15. A non-transitory computer-readable storage medium comprising instructions stored therein that, when executed by a processor of a computing device, cause the processor to:

receive a relay request packet sent by a client, wherein the relay request packet comprises a transaction identifier, and the transaction identifier comprises a mode field and a routing information field;

acquire routing information of a first relay server of the at least two relay servers based on a value of the mode field and a value of the routing information field in the relay request packet; and send a relay allocation packet carrying the routing information of the first relay server to the client, so that the client establishes a relay channel based on the routing information of the first relay server;

wherein instructions, when executed by the processor of the computing device, further cause the processor to:

receive a data packet sent by the client through the relay channel, wherein the data packet comprises the mode field and the routing information field in the transaction identifier; and send the data packet to the first relay server based on a value of the mode field and a value of the routing information field in the data packet;

wherein in the data packet, the value of the mode field represents a specific address mode, the routing information field comprises an encrypted address field and an encrypted port field, a value of the encrypted address field is an encrypted intranet IP address of the first relay server, and a value of the encrypted port field is encrypted information about a first port;

the sending the data packet to the first relay server comprises:

decrypting the encrypted address field and the encrypted port field in the data packet separately based on a pre-acquired decryption key; and after it is learned through parsing that, in the data packet, the value of the mode field represents a specific address mode, sending the data packet to the first port of the first relay server based on the intranet IP address of the first relay server and the information about the first port that are obtained through decryption.

* * * * *